United States Patent
Lopaska

[11] Patent Number: 5,832,788
[45] Date of Patent: Nov. 10, 1998

[54] KINETIC ENERGY MULTIPLIER WITH DRIVING UNIT

[75] Inventor: Ladislav Lopaska, Piestany, Slovakia

[73] Assignee: Lambda GmbH, Piestany, Slovakia

[21] Appl. No.: 525,753

[22] PCT Filed: Apr. 16, 1993

[86] PCT No.: PCT/SK93/00003

§ 371 Date: Sep. 12, 1995

§ 102(e) Date: Sep. 12, 1995

[87] PCT Pub. No.: WO94/21916

PCT Pub. Date: Sep. 29, 1994

[51] Int. Cl.[6] .................................... F16F 15/30
[52] U.S. Cl. ............................................... 74/572
[58] Field of Search .................. 74/572, 573 R, 74/574

[56] References Cited

U.S. PATENT DOCUMENTS

| 4,811,625 | 3/1989 | Sorg et al. ......................... 74/572 |
| 5,156,058 | 10/1992 | Bristow, Jr. ....................... 74/572 |

FOREIGN PATENT DOCUMENTS

| 0498136 | 8/1992 | European Pat. Off. . |
| 8803907 | 9/1988 | Germany . |
| 80543 | 7/1981 | Japan ........................... 74/572 |
| 726387 | 4/1980 | U.S.S.R. ....................... 74/572 |

*Primary Examiner*—Rodney H. Bonck
*Assistant Examiner*—Mary Ann Battista
*Attorney, Agent, or Firm*—Horst M. Kasper

[57] ABSTRACT

A kinetic energy driving unit comprises a flywheel (1) attached to a shaft (3) of an operating machine (4). Driving units (2) are attached to a circumference of the flywheel (1). A rotatable arm is disposed at a shaft of each driving unit. Rotatable devices are attached on the rotatable arm of the drive unit. An arm is fixedly attached to each one of the rotatable devices. A weight body is disposed at an end of the arm.

18 Claims, 4 Drawing Sheets

"5,832,788"

KINETIC ENERGY MULTIPLIER WITH DRIVING UNIT

BACKGROUND OF THE INVENTION

1. Field of the Invention

The invention relates to a device for utilizing drive torques and opposed torques of rotary or linear motors, which are attached to the circumference of flywheels, with the co-operation of the weight or of centrifugal force.

2. Brief Description of the Background of the Invention Including Prior Art

All types of drive units, for example electric motors, internal combustion engines, hydraulic motors, aerostatic engines etc. operate in such a way that the drive torque transmitted on the shaft transmits the power to the operating device directly through the clutch. In the case of stationary devices, the opposed torque is absorbed in the foundations into which the device is built. In the case of mobile devices, the opposed torque is balanced by the weight of the mobile device. In all these devices, the power of the drive units is transmitted directly to the operating machine. In special cases, no more approximate solution was found than the solutions according to the Czechoslovakian Patents Nos. 122423, 139446, 139751 and AO 160382. These however do not relate to the field of our invention. Further foreign documents WO 85/04139 and DE 2947369/A1, which solve the problem of power application to the drive system from a slightly different standpoint, or which derive the drive power directly, are no hindrance to our solution. The disadvantage of present drive units is that they utilize only the drive torque with the associated rotational speed. Among the further disadvantages are high fuel consumption, its ecological harmfulness, its low efficiency, etc.

SUMMARY OF THE INVENTION

1. Purposes of the Invention

It is an object of the present invention to provide a kinetic energy multiplier with driving unit being able to increase the degree of efficiency of rotary devices, such as electric motors, internal combustion engines, hydraulic motors, aerostatic engines.

These and other objects and advantages of the present invention will become evident from the description which follows.

2. Brief Description of the Invention

The multiplier of kinetic energy with drive unit (FIG. 6) is formed by a flywheel secured to the shaft 3 of the operating machine.

Attached to the circumference of the flywheel are drive units 2 (FIGS. 5, 6), which include rotatable (FIG. 1). These are really rotary engines, their driving and opposed torques which, in co-operation with one another, form both types of torque, change: the driving and also the opposed into a uniform absolute torque, which fulfils the conditions for a free vector; a torque of a power couple, which can be displaced or increased at will in the plane. The power-couple torque formed by the drive unit 2 is transmitted to the multiplier of kinetic energy, the flywheel 1, by means of the brake 11 (FIG. 1). This ensures the staged turning-on of the flywheel 1 1, which accumulates a considerable amount of kinetic energy. At increased rotational speed we begin to take off the power formed. The type and method explained enables us considerably to increase the degree of efficiency of rotatable devices 66 (FIG. 1).

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
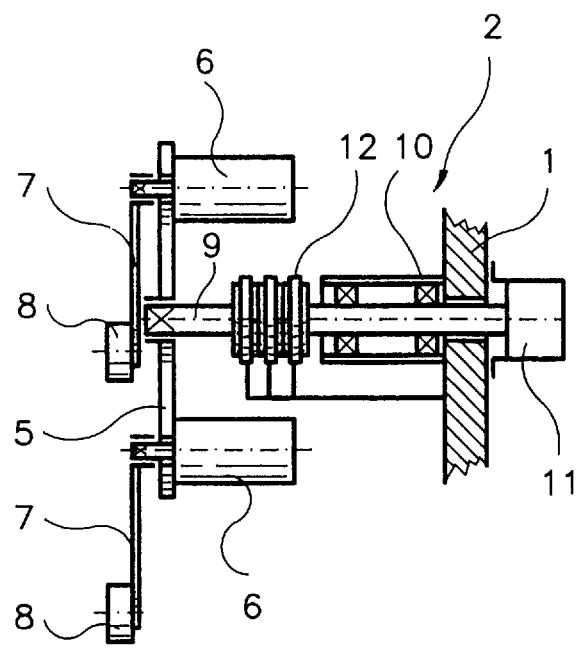
FIG. 1: shows a cross-section of the drive unit.

The subject of the invention comprises a multiplier of kinetic energy 1, upon which the drive units 2 (FIGS. 5 and 6) are attached. The multiplier of kinetic energy 1 is a flywheel, which is secured to the primary shaft 3 of the operating machine 4 (FIG. 6). On the circumference of the flywheel 1 are attached to the drive units 2, which comprise the rotatable arm 5 of the drive unit 2, upon which rotatable arm 5 the rotatable devices 66 with a tertiary shaft 6 (FIGS. 1, 2, 5) are attached. The secondary arm 7 with the weight 8 (FIG. 1) is secured attached (FIG. 1) to the drive portion of the rotatable device 66. The rotatable arm 5 of the drive unit 2 is attached to the secondary shaft 9 of the drive unit 2 in a bearing 10, which is secured in a brake 11 on the flywheel 1. The supply of electrical power to the rotatable device 66 is effected by means of the junction rings 12 (FIGS. 1, 2, 5, 6).

The device operates as follows: Displacement of the point of action of the weight "G" (of force "O") in the point of rotation II/II (FIGS. 3, 4, 5) is effected according to the laws of mechanics: it is possible to deflect the force on the member in a regular manner into another field of action, by means of the connection of a couple whose torque is equal to the product of the given force and its distance from the new point of action II/II.

Practical Example for the Formation of a Free Vector of a Power Couple.

Figure 3:
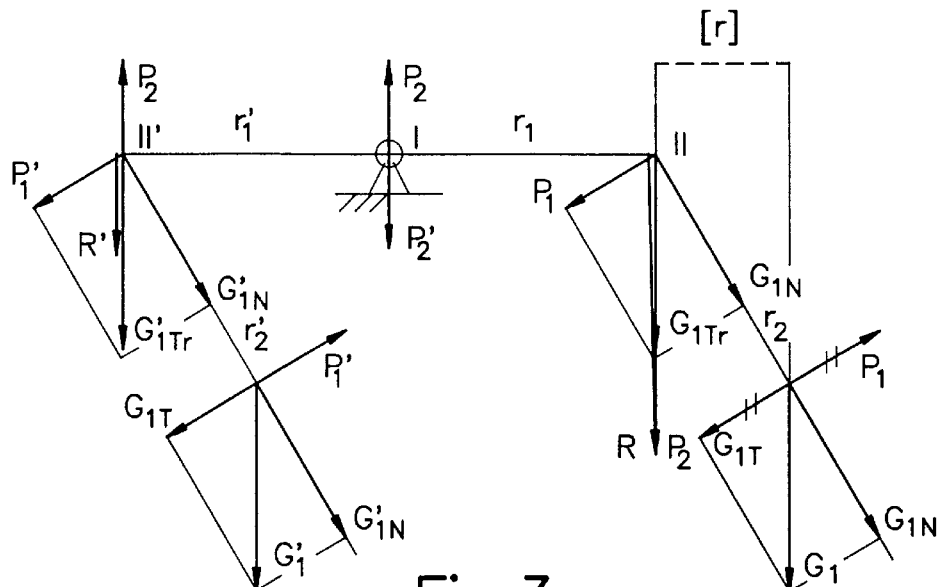
FIG. 3: shows proof of the effectiveness of the drive unit with the participation of weight.
Figure 4:
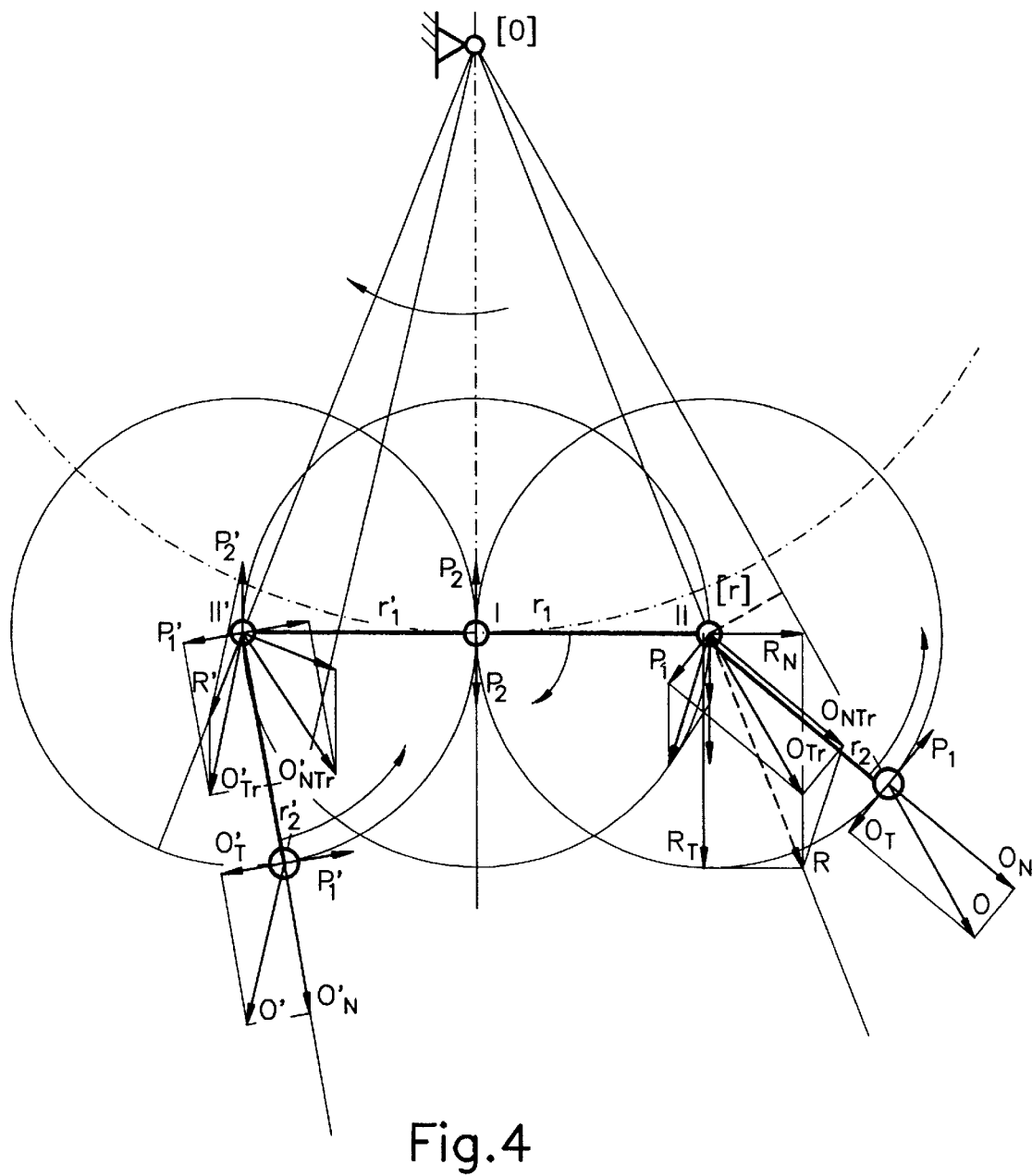
FIG. 4: shows proof of the effectiveness of the drive unit with the participation of centrifugal force.

The absolute torque is apparent from FIG. 3.

The rotatable device 66, mounted in point II, II', has the torque:

$$M_t = G_1 \cdot [r] = P_1 \cdot r_2 \ 557 N/n = P_2 \cdot r_1$$

A couple results which has drive and opposed forces of equal magnitude.

Torque $P_1 \cdot r_2$ . . . Drive torque

Torque $P_2 \cdot r_1$ . . . Contrary torque $G_1$ . . . weight 8 FIGS. 3, 4

Figure 5:
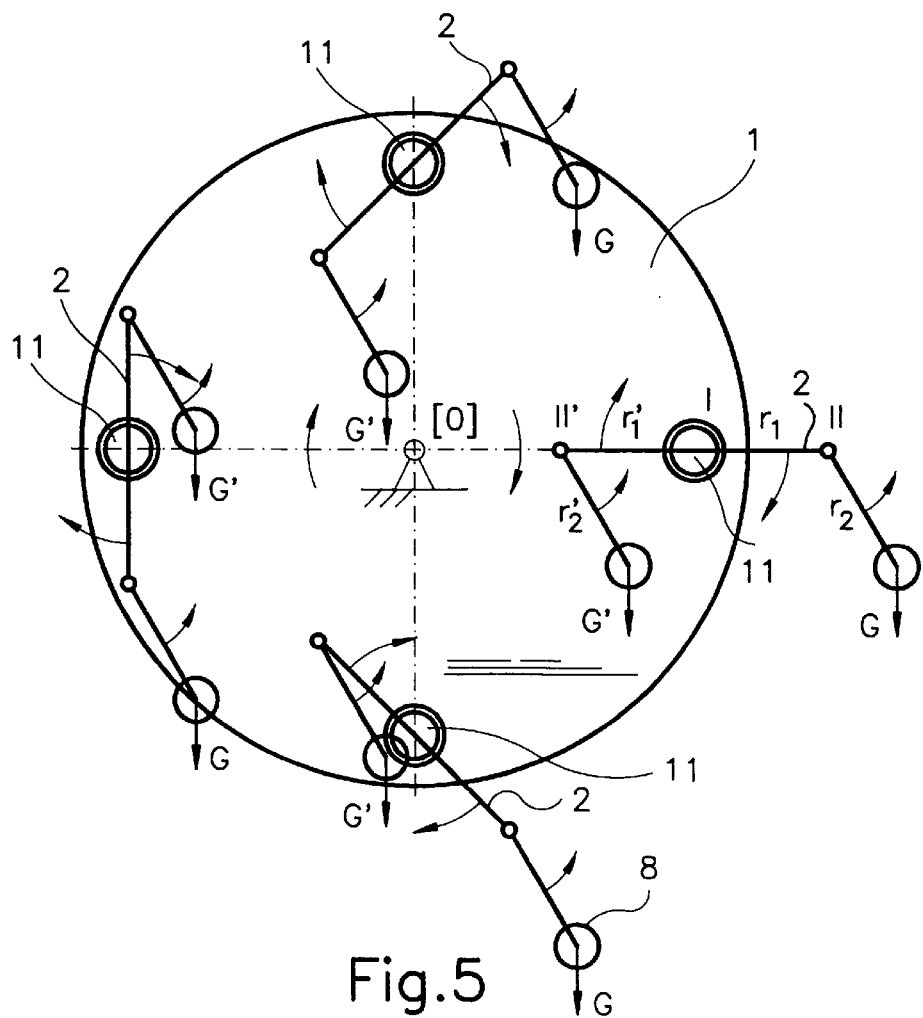
FIG. 5: shows the multiplier of kinetic energy, with the arrangement of the drive units.
Figure 6:
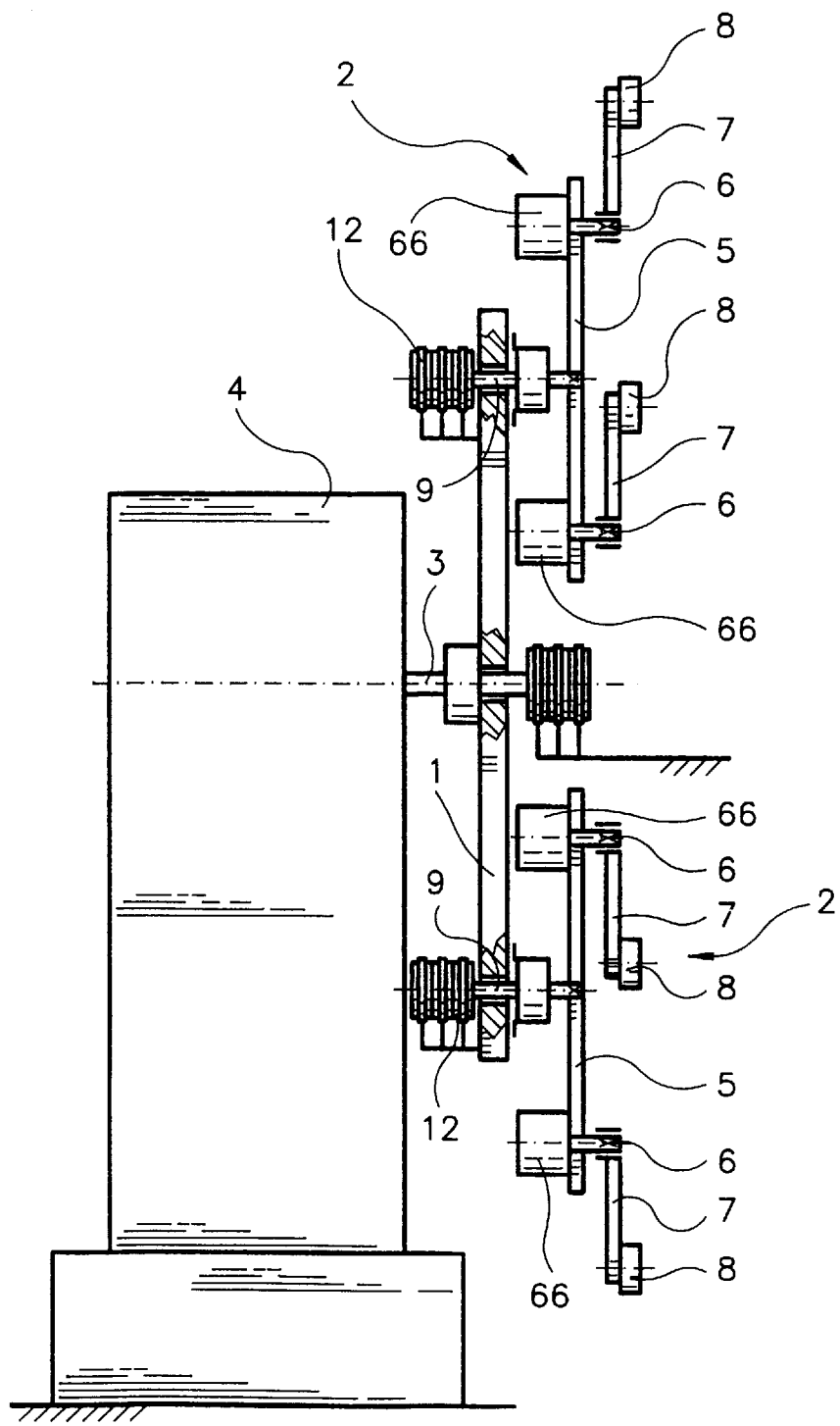
FIG. 6: shows the multiplier of kinetic energy with the drive units.

O . . . centrifugal weight 8 FIG. 5

[r] . . . distance from point of rotation II/II' at the connecting line O: II, or vertical distance of the weight "G" on the point of rotation II, (II')

9 557N/n=M$_t$ of the rotary device 66 used

During transformation of the weight "G$_1$" from the end of the arm -r$_2$-; (r$_2$') into the point of rotation II, (II'), the procedure is as follows:

in terms of vectors, the weights G$_1$ (G$_1$') are resolved in the direction of the arm -r$_2$- "G$_{IN}$", and in the direction of the tangent to the arm -r$_{2+}$- "G$_{IT}$".

G$_{IN}$=G$_1$ cos

G$_{IT}$=G$_1$ sin=P$_1$

The torque P$_1$.r$_2$, formed by the driving torque, together with the opposed torque P$_2$, r$_1$, transform the weight G$_1$ into the point of rotation II of the given device in such a way that G$_1$ ceases with the force P$_1$ (of the driving torque)

G$_{IN}$ is displaced in the direction of rotation; point II.

The second side of the couple of forces of the torque mentioned P$_2$.r$_1$ is counted together with the displaced component G$_{IN}$. The transformed G$_{1tr}$ is obtained. The opposed torque P$_2$.r$_1$, which is equal to the driving torque (because r$_1$=r$_2$).

P$_1$.r$_2$ is added at point II with G$_{1tr}$ $$R=G_{1tr}+P_2$$

Torque of the resultant:

$$M_{tr}=R.r_1$$

Similarly, on the other side:

$$R=G_{1tr}-P_2$$

$$M_{tr}=R.r_1$$

The resultant torque:

$$M_{tv}=M_{tR}+M_{tR},$$

$$M_{tv}=2M_{tR}$$

The rotations of the rotatable device 6 are equal to the rotations of the drive unit 2 (FIGS. 1, 6).

The sum of the powers at the input is equal to the power at the output, less friction losses. The rotary movement is already transformed into a rotary movement without reaction, i.e. into an absolute movement, (a torque couple without reaction). The rotatable device 66 (FIG. 1) can be an electric motor, electric motor with shift transmission, hydraulic motor, aerostatic engine, or a combination thereof.

Practical Example for Utilization of the Kinetic Energy Driving Unit including a flywheel 1 (FIGS. 5, 6)

One to "n" pairs of drive units 2 may be attached to the circumference of the flywheel 1. The drive unit 2 operates as indicated in the description relating to FIGS. 1, 2, 3 and 4. It rotates about the point "1" in the brake 11 with the rotational speed of the operational rotatable device 66 and transmits the free vector (the absolute torque), the torque of the power couple, which the drive unit 2 exerts on the flywheel 1.

The brake 11 may be mechanical, electrical, pneumatic or a combination thereof.

The power couples which act on the flywheel 1 have collinear vectors, and therefore may be added algebraically:

$$M_v=M_1+M_2+\ldots+M_n$$

Figure 2:
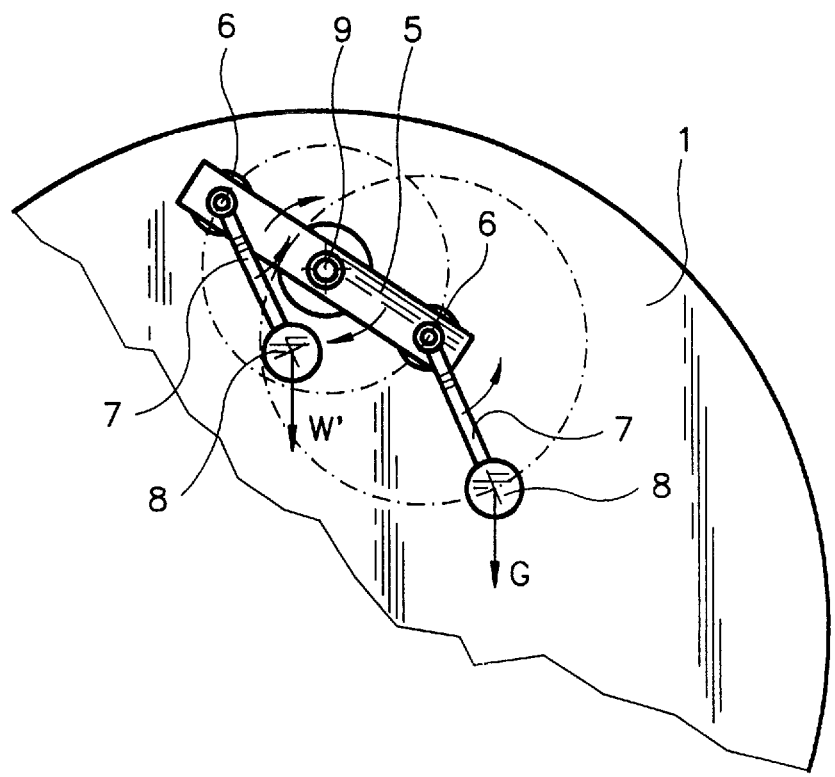
FIG. 2: shows a front elevation of the drive unit.

M$_v$ . . . resultant torque of the drive units 2 (FIG. 6) of the rotatable device 66 (FIGS. 1, 2)

M$_v$=9 557 N$_v$/n$_1$

N$_v$ . . . Σ of the powers of the rotatable devices 6 n$_1$ . . . revolutions of the rotary device 66

The multiplier of kinetic energy has the moment of inertia:

$$M_z=\frac{I_Q}{g}=I_m\cdot\phi$$

I$_Q$ moment of inertia of the weight

I$_m$ moment of inertia of the mass

φ angular acceleration of the rotation of the flywheel

The acceleration of the multiplier of kinetic energy—of the flywheel 1 is calculated from the comparison:

$$M_v=M_z$$

$$9\ 557\ N_v/n_1=I_m.\phi$$

$$\phi=M_v/I_m$$

After displacement of the flywheel 1 into the optimum direction of rotation:

$$\omega_z=\phi.t$$

ω$_z$ . . . angular velocity of the flywheel, the accumulated kinetic energy grows with the linear growth of time "t":

$$K=½.I_m.\omega^2_z=½.I_m.\phi^2.t^2$$

Capacity of the device:

$$\eta=M_z/N_v$$

$$N_v=M_v.n_1/9\ 557$$

$$\eta=M_z.n_z/M_v.n_1$$

$$N_z=I_m\phi^2.t/102=I_m.\phi.102/9\ 557$$

The system mentioned makes it possible considerably to increase the power of the devices.

Type of Industrial Applicability of the Invention:

The devices-multipliers according to the invention may be used in all fields of economic life. It is possible to use the multipliers also in the generation of electrical power, and for propulsion of mobile devices.

It will be understood that each of the elements described above, or two or more together, may also find useful application in other types of a kinetic energy multiplier differing from the types described above.

While the invention has been illustrated and described as embodied in the context of a kinetic energy multiplier consisting of a flywheel with driving units, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A kinetic energy driving unit wherein
a flywheel (1) is provided, wherein the flywheel (1) is fixedly attached to a primary shaft (3) of an operating machine (4), wherein a drive unit (2) is disposed on a circumference of the flywheel and drives the flywheel, wherein the drive unit (2) is formed by a rotatable arm (5), wherein an electromotor with a rotatable device (66) is in each case disposed at an extremity of the rotatable arm (5).

2. The kinetic energy driving unit according to claim 1, wherein a secondary arm (7) with a weight (8) is in each case securely attached to a tertiary shaft of the rotatable device (66).

3. The kinetic energy driving unit according to claim 1, wherein the rotatable arm (5) of the drive unit (2) is fixedly attached to a secondary shaft (9), wherein the secondary shaft (9) is resting in a bearing (10) of the drive unit (2).

4. The kinetic energy driving unit according to claim 3, wherein a brake (11) is furnished at a circumference of the secondary shaft (9) and thereby forms a connection between the secondary shaft (9) and the flywheel (1), wherein the brake (11) induces a gradual increase in revolution of the flywheel (1) and furnishes an accumulation of kinetic energy.

5. A kinetic energy driving unit comprising
an operating machine (4);
a primary shaft (3) attached to the operating machine (4);
a flywheel (1) attached to the primary shaft (3);
a drive unit (2) attached on a circumference of the flywheel (1), and
a rotatable arm (5) forming part of the drive unit (2).

6. The kinetic energy driving unit according to claim 5, further comprising a secondary arm (7) fixedly attached at a first end to a tertiary shaft (6) of an electromotor with rotatable device (66);
a weight body (8) disposed at a second end of the secondary arm (7), wherein said electromotor is fixedly attached at the rotatable arm (5) of the drive unit (2) with a stator of the electromotor.

7. The kinetic energy driving unit according to claim 6, further comprising
a bearing (10) disposed in the drive unit (2);
a secondary shaft (9) disposed in the bearing (10) for the drive unit (2) and for providing a fixed connection for the rotatable arm (5) of the drive unit (2).

8. The kinetic energy driving unit according to claim 5, further comprising
a brake (11), wherein a first side of the brake (11) is attached at the flywheel (1), wherein a second side of the brake (11) is attached at a shaft (9), and wherein the shaft (9) is driven by the drive unit (2).

9. A kinetic energy driving unit comprising:
a flywheel (1) fixedly attached to a shaft (3) of an operating machine (4);
a drive unit (2), wherein the drive unit includes a rotatable arm (5), wherein the drive unit (2) is attached to a circumference of the flywheel; and
a first rotatable device (66) attached to a first end of the rotatable arm (5) of said drive unit (2);
a second rotatable device (66) attached to a second end of the rotatable arm (5) of said drive unit (2).

10. The kinetic energy driving unit according to claim 9, further comprising
a secondary arm (7) with a weight (8) securely attached in each case to a tertiary shaft (6) of the first rotatable device (66) and of the second rotatable device (66).

11. The kinetic energy driving unit according to claim 9, wherein
the rotatable arm (5) of said drive unit (2) is attached to a secondary shaft (9) of said drive unit (2), wherein the secondary shaft (9) is disposed in a bearing (10) attached to the flywheel, and wherein the secondary shaft (9) is provided with a brake (11) cooperating with the flywheel.

12. The kinetic energy driving unit according to claim 9, wherein
said drive unit (2) includes a secondary shaft (9) attached to the flywheel through a bearing (10), and wherein the secondary shaft (9) has a brake (11) for connecting said drive unit to the flywheel, thereby transmitting kinetic energy from said drive unit (2) to the flywheel.

13. A kinetic energy driving unit comprising
an operating machine;
a primary shaft attached to the operating machine;
a flywheel attached to the primary shaft;
a drive unit attached on a circumference of the primary shaft, with the drive unit having a rotatable arm;
rotatable devices attached on the rotatable arm of the drive unit thereby driving the flywheel.

14. The kinetic energy driving unit according to claim 13, further comprising
a secondary arm fixedly attached to each one of the rotatable devices;
a weight body disposed at an end of each said secondary arm.

15. The kinetic energy driving unit according to claim 14, further comprising
a bearing disposed in the drive unit;
a secondary shaft disposed in the bearing for the drive unit and for attaching the rotatable arm of the drive unit;
a brake furnished at the secondary shaft for engaging the secondary shaft and attached to the circumference of the flywheel.

16. The kinetic energy driving unit according to claim 13, further comprising
a bearing disposed in the drive unit;
a secondary shaft, wherein the bearing is disposed surrounding the secondary shaft;
a brake furnished at the circumference of the secondary shaft for connecting the flywheel to the secondary shaft.

17. The kinetic energy driving unit according to claim 9, wherein said drive unit is a rotary motor.

18. The kinetic energy driving unit according to claim 17, wherein said rotary motor is an electric motor.

* * * * *